J. I. KUMAUCHI.
REFLECTING APPARATUS.
APPLICATION FILED MAY 1, 1916.
1,226,537.
Patented May 15, 1917.
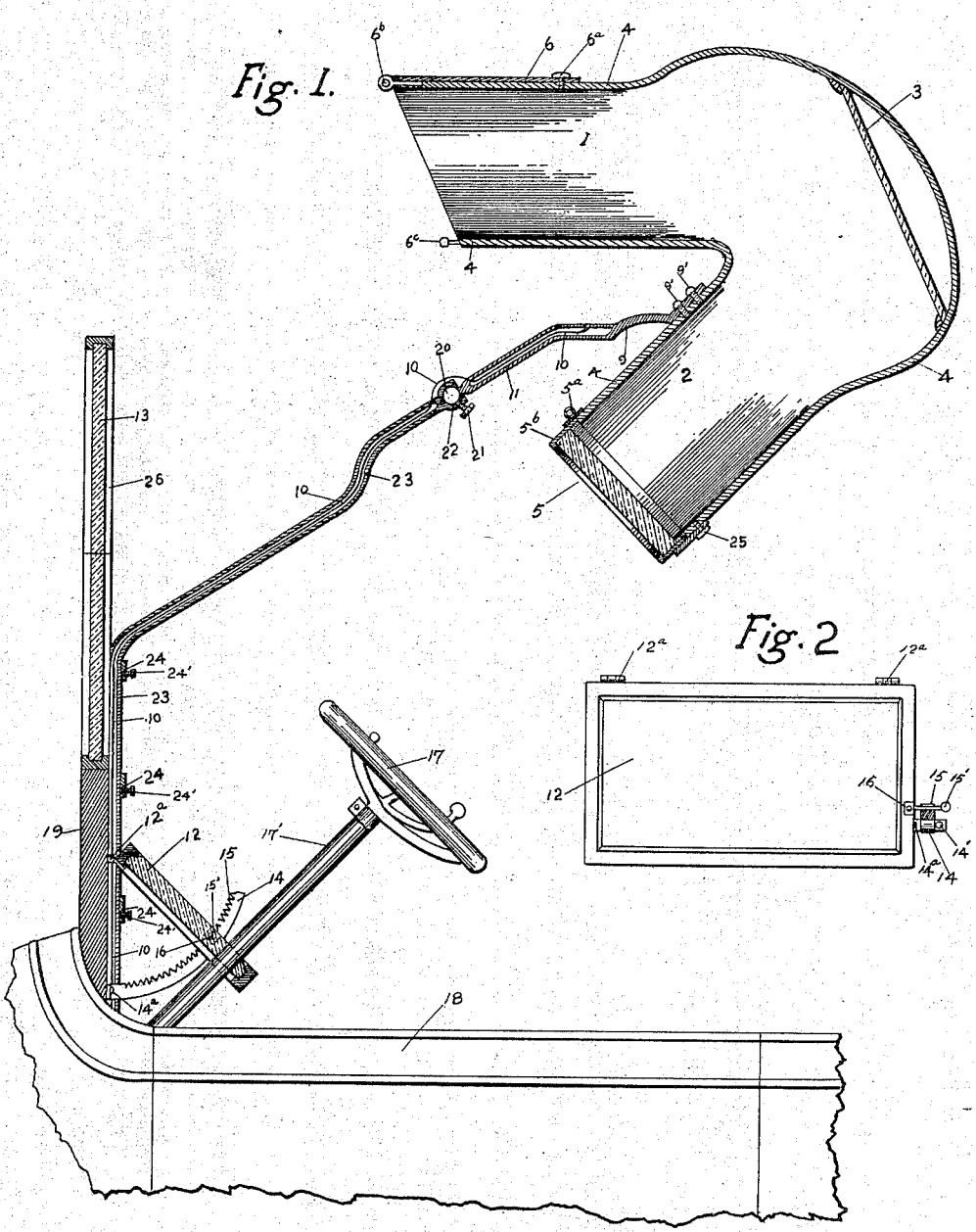
INVENTOR
James I. Kumauchi
BY
ATTORNEY

UNITED STATES PATENT OFFICE.

JAMES ISABURO KUMAUCHI, OF SEATTLE, WASHINGTON.

REFLECTING APPARATUS.

1,226,537.      Specification of Letters Patent.      Patented May 15, 1917.

Application filed May 1, 1916. Serial No. 94,804.

*To all whom it may concern:*

Be it known that I, JAMES ISABURO KUMAUCHI, a subject of the Emperor of Japan, residing at Seattle, in the county of King and State of Washington, have invented certain new and useful Improvements in Reflecting Apparatus; and I do hereby declare the following to be a full, clear, and exact description of the invention, such as will enable others skilled in the art to which it appertains to make and use the same.

This invention relates to apparatus for detecting obstructions in the roadway ahead of vehicles, and particularly to an apparatus with a reflecting mirror whereby a view of the road ahead of the vehicle is reflected upon a surface facing in an opposite direction from that in which the vehicle is moving.

It further relates to an apparatus for disclosing to the driver or operator a view of the area in front of the vehicle by means of reflection along lines other than in direct view of the operator.

Figure 1 represents the side view of the apparatus in section.

Fig. 2, represents a detail view of the display mirror.

Like numerals on the different figures represent like parts of the apparatus.

The device or apparatus is designed to be used primarily by drivers of automobiles, cars or other vehicles whereon it is necessary that the driver be able at all times to determine what may be ahead of the vehicle by the use of his vision, and is designed to enable such operator to so see ahead by means of the reflection of any objects ahead upon a display mirror or other reflecting surface placed before him in such position that it is protected from rain, mist or other similar means clouding the glass windows or shields placed in front of the vehicle, so that the rain, etc., will not interfere with his view through the means of this apparatus.

This device is arranged with a reflecting mirror which is in line and in view of the road ahead, and will throw such head view upon a display surface behind the front portion of the vehicle, the mirror being protected from clouding by rain or mist.

Numeral 18 represents the body of the vehicle, with its front end toward the left in Fig. 1, 19 is the dash, and 13 a glass front or windshield in common use in vehicles, and which is intended to extend upward to the cover or roof of the vehicle, the roof not shown in the drawings as unnecessary hereto; 26 shows a frame of metal or other suitable means placed along the end edges of the windshield for supports; 24, 24, 24 shows clamps or brackets fixed to the supports 19 and 26 which clamps have their body portions bent in forms of loops so that a standard composed of a round shaft may be held upright within the clamps and revolved when desired by the operator, a set screw 24' in one of the clamps may be used to hold the shaft 23 from revolving except when turned by the operator.

Above the top bracket 24 the standard 23 is bent backward on an angle and its upper end terminates in a socket 22 for a ball joint 20, a set screw 21 is placed in the socket to hold the ball at any determined position, 11 is a shaft or rod connected to the ball and forms an extension of the lower part of the standard 23. On the outer end of rod 11 is supported a frame or bent tubing 4 substantially in form of the letter U, the upper or collecting arm 1 thereof facing toward the front of the vehicle and in a line above and to the right side of the shield 13; the other or projecting arm 2 of the U faces at an angle downward and forward at a point within and behind the dash 19. Within the member 4 is fixed a mirror, as represented 3, a part thereof, and so arranged that any object in front of the arm 1 will be reflected by the mirror 3 and its image projected down and out through the arm 2 and upon any suitable reflecting or display surface, which in the drawing is shown as a mirror 12.

The lower mouth of the projecting arm 2 is closed with a glass 5 which does not affect the line of reflection from the mirror 3 to 12, but does prevent a current of air passing through the arms 1 and 2 as the vehicle is driven ahead rapidly, and so any rain drops that may be falling will not be carried back against the mirror 3 and obscure the faces thereof, the member 4 will instead hold a cushion of air against the falling rain or mist but permit the line of view from the objects in front to the mirrors 3. The glass 5 may be held by a frame $5^b$ and hinge $5^a$, and lock pin 25, and be readily moved for cleaning its inner side or the mirror 3. A door 6 with a hinge $6^b$ is fastened to the front of the arm 1 and may be folded back and so held by a turn button or screw $6^a$ at any time when the apparatus is in use or may be closed down across the opening and held closed by another button 6ᶜ when the apparatus is not required, and so dust will be kept out of the member 4. The member 4 may be attached removably to the rod 11 and brace 9 by screws 9', 9'.

The display mirror 12 is held in place by hinges 12ᵃ connected with the frame 19, and its position in any desired angle is determined by a latch 15' and its hinge 16, the latch dropping with its weight into any of a series of teeth 15 on the top face of a curved rack bar 14. The bar 14 is held in position adjoining the right hand end of the mirror 12 by bolts 14ᵃ and 14'.

The steering gear and wheel 17 is placed in its customary place in front of the seat of the driver on the left side of the vehicle and the mirror 12, just to the right of the shaft 17'.

As the position of the member 4 is altered by elevating the collecting arm 1, the line of reflection from the mirror 3 will be changed, and the mirror 12 may be then adjusted by the latch and bar teeth 15 accordingly. As the member 4 may be at times held in position outside of the line of the right side wall of the vehicle, it may be necessary to adjust the angle of the member 4 to different positions on the mirror 12, and the latter is accordingly constructed with a face longer than the distance of the diameter of the member 4.

In cases where it may be desired to have the member 4 held in position over the vehicle and within the side lines of the cover or roof, the rod 23 is adjusted through the roof and the joint 22 may be preferably above the roof also. The particular position of the member 4 in connection with the parts of the vehicle shown in the drawing may be materially changed with varying conditions, or construction of different vehicles.

This apparatus may also be used for vessels and other purposes in addition to vehicles.

What I claim is:

1. A periscope for moving machines consisting of a bent tube comprising a collecting arm, a projecting arm, and a reflector at the angle between said arms; means for supporting the tube with the mouth of its collecting arm directed forward, and a glass across the mouth of the projecting arm.

2. A periscope for moving machines consisting of a bent tube comprising a collecting arm, a projecting arm, and a reflector at the angle between said arms; means for supporting the tube with the mouth of its collecting arm directed forward, a glass across the mouth of the projecting arm, and a hinged closure for the front end of the collecting arm to close the latter when out of use.

3. In a periscope for moving machines, the combination with a bent tube comprising a collecting arm directed forward, a projecting arm standing at an angle to the collecting arm, a reflector within said angle, and a glass across the mouth of the projecting arm; of means on the machines for supporting said tube and adjusting its position, a display surface in line with the axis of said projecting arm, and an adjustable support for said surface.

In testimony whereof I affix my signature.

JAMES ISABURO KUMAUCHI.